Patented May 29, 1928.

1,671,314

UNITED STATES PATENT OFFICE.

WILLIAM BEACH PRATT, OF WELLESLEY, MASSACHUSETTS, ASSIGNOR, BY MESNE ASSIGNMENTS, TO DISPERSIONS PROCESS, INC., OF DOVER, DELAWARE, A CORPORATION OF DELAWARE.

PROCESS OF PRODUCING RUBBER-LIKE BODIES.

No Drawing.    Application filed February 17, 1926. Serial No. 88,933.

This invention has for its object the production of substitutes for natural crude rubber, such as obtained by the coagulation of the rubber globules contained in the latex of *Hevea brasiliensis* and other so-called rubber trees.

It has long been my theory that crude rubber consists of a mass of adhering rubber globules, which preserve their identities notwithstanding their adhesion to contiguous globules, and in previous applications for Letters Patent I have shown that by certain treatment the globules may be separated, one from another, and dispersed in water. It is further generally agreed that the rubber globules in latex comprise a terpene center or core and a proteid protective envelope or film. Nature forms these globules in a serum of which the greater part is water, and on coagulation these separate globules become contracted and distorted in shape and form a coherent mass of facially-contacting and adhering particles or globules without disrupting their protective films or coatings.

In attempting to produce an equivalent rubber-like mass, it would appear logical at least to follow the order of production which nature has pointed out. That is to say, it has seemed to me that one should first produce what may be termed an aqueous dispersion of artificial globules, each having a terpene center and a protective film or coating, and then cause the coagulation of such globules in a coherent mass of facially adhering globules.

Since the center or core of naturally occurring globules is a terpene, one should select a terpene which approximates the chemical and physical characteristics thereof. Usually it is considered that this core or center is a polymerized mass of molecules of the $(C_5H_8)_n$ group, but since there are a great many species of crude rubber, I think it possible, and indeed have reason for believing it probable, that the terpene centers of some of these naturally occurring globules consist of different groupings of carbon and hydrogen atoms. In all cases, however, where a vulcanizable crude rubber is formed, the terpene center must be capable of adding on sulphur by chemical reaction. Considering isoprene, or even dipentene, or some other equivalent terpene capable of polymerization and of forming a sulphur addition compound, as the logical material with which to work, the next step is to cause its polymerization and its dispersion in water in globules of the same order of magnitude as naturally occurring rubber globules. The step of polymerization is one which is well known and need not be described in detail. But in effecting the dispersion of the terpene in water, it is necessary to select some material which can be used to form the protective films or envelopes for the dispersed globules. Such material should be hydrophilic or capable of water absorption, since this is a characteristic of the protective envelopes or coatings of naturally occurring rubber globules. There are various proteids which may be employed, including various animal or vegetable albumens, glutens and even starches, when they have been properly treated.

I have found that it is possible to effect the dispersion of various substances which are immiscible with water in particle size no larger than naturally occurring crude rubber globules, as pointed out in my application Serial No. 749,803, filed November 13, 1924. To accomplish this the material must be formed into a sticky or adhesive or plastic mass at a temperature above the freezing point and below the boiling point of water. This is done by either heating or chilling the material according to its natural viscosity at room temperature. The terpene selected—polymerized isoprene for example—according to one method of practising my invention, is placed in a two-blade mixer of the general character of a "Werner & Pfleiderer" or dough mixer in which two helicoidal blades are slowly rotated at relatively different speeds in a trough-like casing without touching or scraping each other or the internal walls of the casing. Such a mixer should be provided with a cover and a jacket for the circulation of the heating or cooling medium. Having rendered the terpene in a sticky "stringy" condition at a temperature of about 130° F., the blades are set slowly in motion and at the same time water is slowly and gradually fed into the mixer. As the operation continues the mass is kneaded, stretched and pulled in the presence of the water, and the water is absorbed by and disappears in the mass. Ordinarily the amount of water thus added is about 10% to 12% by weight to that of the terpene. This apparently, or so I believe, has the effect of forming a dispersion in which water is the disperse phase and of conditioning the terpene so that it may be dispersed in particles of colloidal size.

I now add to the mass while in the mixer a hydrophilic colloid which functions as a dispersing agent and forms the protective films or coatings for the dispersed particles. For this purpose I employ a proteid, such as animal or vegetable albumen, or casein, which is preferably moistened with water, and this, together with a small amount of water, is added to the mixer and thoroughly incorporated by the kneading, stretching and pulling operation of the blades into the water-saturated plastic mass of terpene. Then while the operation is continued, water is slowly and gradually added to the mass until a change of phase occurs, and the colloid-coated terpene particles become the disperse phase and the water the continuous phase of the mass. The product is a very smooth, non-sticky, non-adhesive paste of about the consistency of butter, and may be spread in a film on a suitable surface. On removing the water by evaporation, the film becomes continuous like a film of dispersed rubber from which water is evaporated. The mass on removal from the mixer consists of the continuous aqueous medium in which are dispersed microscopic particles of terpene each coated or protected by an envelope or membrane of the proteid dispersing agents. By heating or by vacuum drying the water may be removed from the mass.

It is desirable that the proteid envelopes should possess not only a hydrophilic characteristic, but should also possess the property of flexibility, stretch, and toughness, so that when water has been eliminated from the mass, it may be manipulated and compounded with sulphur, fillers, pigments, softeners, vulcanization accelerators, and the like, upon the usual compounding rolls, without rupture of the envelopes, or protective films. For this purpose I treat the film-protected particles, while still dispersed in the water, with a re-agent which will accomplish the desired result. Thus I add, according to the particular proteid employed as the dispersing agent, a cresol or a creosol, a phenol, tannin, or the like, to the aqueous dispersion while it is still in the mixer. This has the effect not only as a preservative, but also acts to change the character of the proteid coatings, and prevents the rupture of the globules when the mass is manipulated on compounding rolls. The treated films or coatings do not prevent the reaction of sulphur with the terpene centers when the mass is subjected to vulcanization, nor do they prevent the absorption by the centers of solvents. Consequently a mass of the rubber-like product produced as herein described may be swelled either with water or with an organic solvent.

The globule particles may be coagulated by the removal of water or by the addition of any of the agents employed for the coagulation of crude rubber such as acetic acid.

The rubber-like mass so formed has many of the physical characteristics of crude rubber in that the terpene center of the globule is not extractable with acetone, but will swell in gasolene without rupturing the protective coating, and the dry coagulated material will absorb water to the same degree as crude rubber.

In my former application Serial No. 749,803, I described the dispersion of oils, waxes, gums and like products by a process similar in the first step to that employed for the production of the rubber-like substance herein described. The object of such dispersions was to secure a finely sub-divided mass of the dispersed product in an aqueous medium, for the purpose of applying such products in making continuous films, or for the impregnation of fabrics, or for the binding together of fibers in continuous sheets; in other words, a method whereby water could be used to replace organic solvents in such products as are not immiscible with water. The protective coating that was necessarily formed in order to secure such finely sub-divided condition of the dispersed material was considered only as a means to the end whereby the particles could be maintained as the disperse phase in the water phase for application. Upon drying the original characteristics of the dispersed material were re-established in the continuous films formed, or in their binding action in relation to fibrous materials treated with same, since it was primarily intended that the globules should be disrupted so that the dispersed gum, waxes or the like would form a coalescent mass upon the evaporation of the water.

Although employing a somewhat similar process for the sub-dividing of the terpene mass to be dispersed, I employ, according to the present invention, a hydrophilic colloid, capable of maintaining its integrity as a protective film or coating for the dispersed particles, notwithstanding the evaporation of the water phase, and having the capacity of adhering to the coatings of other contiguous globules, so as to form a workable mass like crude rubber. This is the important step of the herein described process and although it may ultimately be found that some particular hydrophilic colloid may of itself, or through reaction with the terpene employed as a center for the globules, have sufficient strength to prevent rupture and fulfill all of the functions possessed by the protective coatings of rubber globules, nevertheless to the present date it has been found necessary to employ a re-agent in order to treat the hydrophilic colloid to produce in it the desired physical characteristics of strength and elasticity.

All crude rubbers have present in the mass, in addition to the rubber globules, an amount of resinous material which aids in the adhesion of globule to globule, and which, without doubt, produces added strength to the coagulated mass when used in the arts for the particular purposes desired. The percentage of such resinous or extractable material in Hevea rubber is from 3% to 5%. In lower grades of rubber this extractable resinous content consists of from 10% to 50% of the total mass.

Whether this resinous material in the natural rubber is represented by the breaking down of less stable globules of the rubber mass on coagulation, or whether it is a free resin dispersed in the serum of the latex, is not essential in considering the rubber-like mass I have been able to produce. I may, if desired, in order to produce certain physical effects such as strength or elongation, add to the rubber mass of globules any desired percentage of resin or resin-like products, either produced synthetically or derived from nature. This added resin would be a material extractable with acetone such as secured from true natural rubbers, and the resulting globular structure formed by my process would be retained as non-extractable material just as occurs from the extraction of natural rubbers.

What I claim is:

A process as herein described, which comprises dispersing a polymerized terpene of the general type of $(C_5H_8)_n$, capable of reacting with sulphur, in particles of colloidal size and coating such dispersed particles with hydrophilic proteid films or envelopes, tanning the films or envelopes of the dispersed particles to increase the strength and toughness thereof, coagulating the particles, and separating and drying the coagulated mass of individual globules or particles.

In testimony whereof I have affixed my signature.

WILLIAM BEACH PRATT.